United States Patent [19]
Faust

[11] 3,914,398
[45] Oct. 21, 1975

[54] PROCESS FOR MAKING ANHYDROUS HYDROGEN FLUORIDE FROM FLUOSILICIC ACID

[75] Inventor: Carl Raymond Faust, Wilmington, Del.

[73] Assignee: E. I. Du Pont de Nemours & Company, Wilmington, Del.

[22] Filed: Dec. 16, 1974

[21] Appl. No.: 534,093

[52] U.S. Cl. ............... 423/483; 423/470; 423/472; 423/520; 423/522; 423/533; 423/541; 423/542
[51] Int. Cl.² .......................................... C01B 7/22
[58] Field of Search ....... 423/483, 541, 541 A, 542, 423/481, 484, 533, 522, 470, 472, 520

[56] References Cited
UNITED STATES PATENTS

| | | | |
|---|---|---|---|
| 2,471,072 | 5/1949 | Merriam | 423/522 |
| 2,799,560 | 7/1957 | Davies | 423/533 X |
| 2,981,601 | 4/1961 | Kidde | 423/483 |
| 3,359,069 | 12/1967 | Furkert et al. | 423/541 A X |
| 3,383,170 | 5/1968 | Furkert et al. | 423/541 X |
| 3,454,360 | 7/1969 | Detweiler | 423/522 |
| 3,537,817 | 11/1970 | Bachelard | 423/483 |
| 3,645,683 | 2/1972 | Isbell, Jr. | 423/541 A X |
| 3,677,701 | 7/1972 | Hollingsworth et al. | 423/483 X |
| 3,761,575 | 9/1973 | Furkert | 423/541 A X |
| 3,829,560 | 8/1974 | Fornoff et al. | 423/533 X |

*Primary Examiner*—Edward Stern

[57] ABSTRACT

Anhydrous hydrogen fluoride is recovered from fluosilicic acid by a process comprising the steps of (1) contacting aqueous fluosilicic acid with an excess of ammonia to produce an aqueous solution of ammonium fluoride which is subsequently recovered, (2) heating the ammonium fluoride solution to remove ammonia and water and to produce liquid ammonium bifluoride; (3) contacting the ammonium bifluoride with sufficient sulfuric acid to produce ammonium bisulfate and hydrogen fluoride and recovering both products; (4) burning the ammonium bisulfate at a temperature of about 850° to 1200°C. to produce a gaseous mixture containing sulfur dioxide; (5) contacting the sulfur dioxide with oxygen in the presence of a catalyst to make sulfur trioxide; (6) contacting the sulfur trioxide with water to produce sulfuric acid; and (7) recycling the sulfuric acid to step (3). Hydrogen fluoride is recovered in step (3) as an anhydrous gas.

10 Claims, 1 Drawing Figure

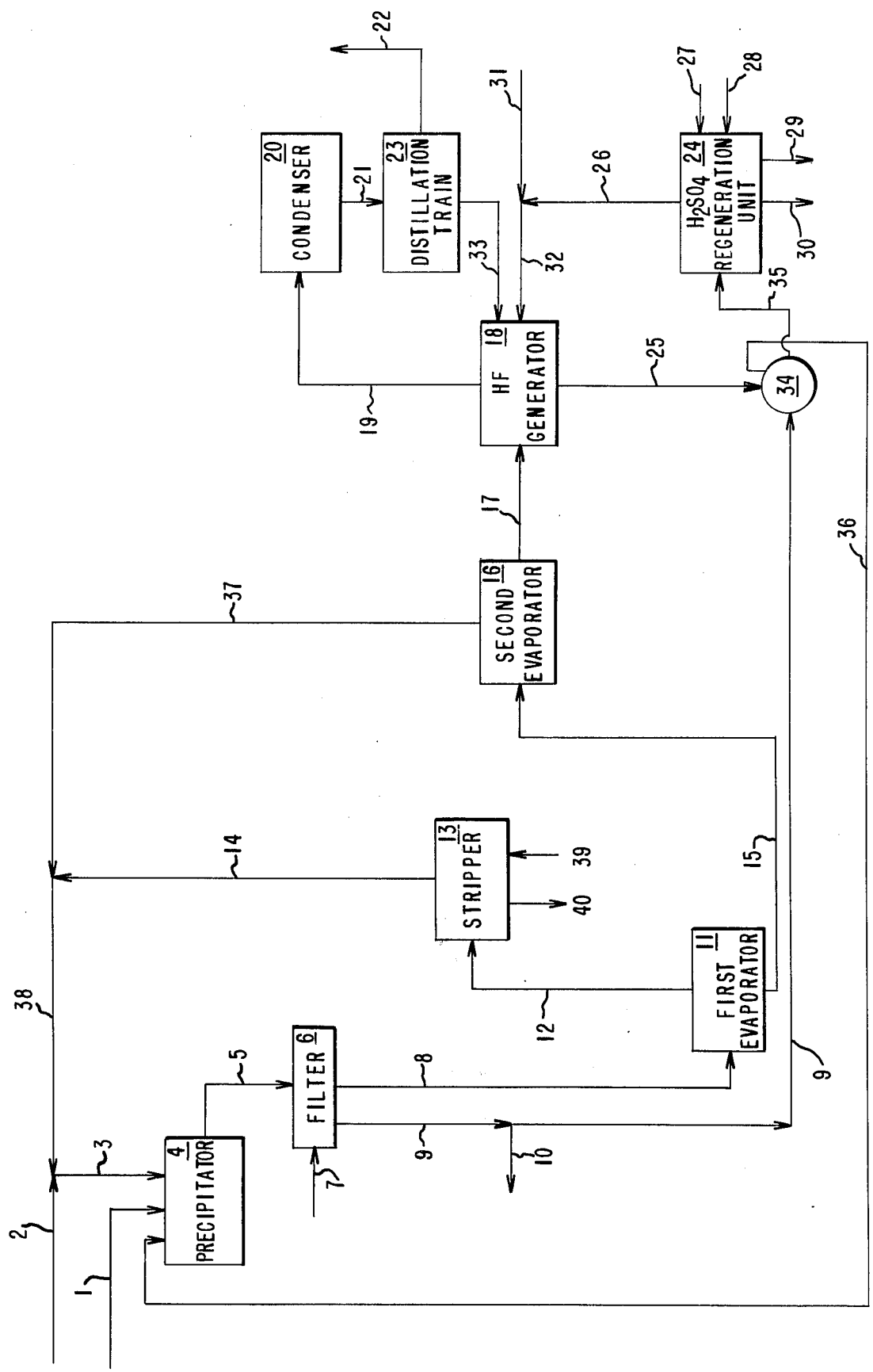

PROCESS FOR MAKING ANHYDROUS HYDROGEN FLUORIDE FROM FLUOSILICIC ACID

BACKGROUND OF THE INVENTION

This invention relates to production of hydrogen fluoride from fluosilicic acid.

There is a rapidly expanding demand for fluoride based chemicals, both of the organic type such as fluorinated hydrocarbons, e.g., "Freon", and polytetrafluoroethylene resins, as well as for inorganic fluorides, such as aluminum fluoride and cryolite which is employed in the manufacture of metallic aluminum. Hydrogen fluoride is used as a chemical raw material in processes for making many of these chemicals. The traditional raw material for the production of hydrogen fluoride has been fluorspar, $CaF_2$. Unfortunately, known reserves of high grade fluorspar ores have not expanded as rapidly as the demand for fluorine chemicals.

The only other potentially larger sources of fluorine are the very extensive deposits of fluorapatite ores. This material is the principal constituent of the phosphate ores used in the manufacture of wet process phosphoric acid and phosphate fertilizers. In such processes fluosilicic acid has been recovered as a by-product. The fluosilicic acid originates when a strong mineral acid such as sulfuric, hydrochloric, nitric or phosphoric acid is used to attack the fluoroapatite ore.

The art has described many processes for recovering the fluoride values from fluosilicic acid. For example, U.S. Pat. No. 3,455,650 issued to Conte et al. on July 15, 1969 discloses a process for recovering hydrogen fluoride comprising reacting an aqueous solution of ammonium fluoride, ammonium bifluoride or mixtures thereof with an aqueous solution of a strong nonvolatile mineral acid, stripping the resulting composition with hot gas to recover a mixture of hydrogen fluoride, water vapor and stripping gas, separating water vapor therefrom by contacting the mixture with a desiccating agent, and separating hydrogen fluoride from the remaining gaseous mixture. The aqueous solution of ammonium fluoride, ammonium bifluoride, or mixtures thereof is obtained by scrubbing off-gas of a phosphate fertilizer process and ammoniating the resulting fluosilicic acid solution.

The reaction of ammonium bifluoride with sulfuric acid to produce hydrogen fluoride is also disclosed in U.S. Pat. No. 2,981,601 issued to G. E. Kidde on Apr. 25, 1961 and U.S. Pat. No. 3,537,817 issued to Bachelard et al. on Nov. 3, 1970.

SUMMARY OF THE INVENTION

This invention is directed to a process for producing anhydrous hydrogen fluoride from fluosilicic acid.

Specifically, anhydrous hydrogen fluoride is produced from fluosilicic acid by an improved process comprising the steps of (1) contacting an aqueous solution of fluosilicic acid with excess ammonia to produce an aqueous solution of ammonium fluoride which is recovered; (2) heating the ammonium fluoride solution to remove ammonia and water and to produce liquid ammonium bifluoride; (3) contacting the ammonium bifluoride with sufficient sulfuric acid to produce ammonium bisulfate and hydrogen fluoride which are recovered; (4) burning the ammonium bisulfate at a temperature of about 850° to 1200°C. to produce a gaseous mixture containing sulfur dioxide; (5) contacting the sulfur dioxide with oxygen in the presence of a catalyst to make sulfur trioxide; (6) contacting the sulfur trioxide with water to produce sulfuric acid; and (7) recycling the sulfuric acid to step (3). Hydrogen fluoride is recovered in step (3) as an anhydrous gas.

In the process of the invention ammonium bisulfate by-product and sulfuric acid are utilized in a manner which minimizes raw material requirements.

BRIEF DESCRIPTION OF THE DRAWING

The drawing is a schematic diagram of a preferred embodiment of the process of the invention.

DETAILED DESCRIPTION OF THE INVENTION

The process of the invention can be represented by the following equations:

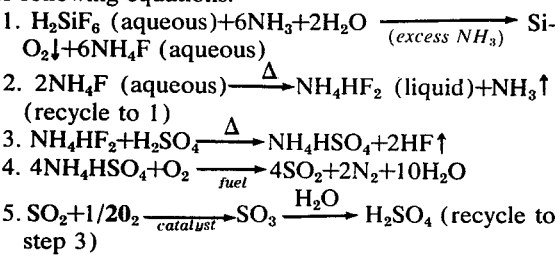

1. $H_2SiF_6$ (aqueous) $+6NH_3+2H_2O \xrightarrow{(excess\ NH_3)} SiO_2\downarrow +6NH_4F$ (aqueous)
2. $2NH_4F$ (aqueous) $\xrightarrow{\Delta} NH_4HF_2$ (liquid) $+NH_3\uparrow$ (recycle to 1)
3. $NH_4HF_2+H_2SO_4 \xrightarrow{\Delta} NH_4HSO_4+2HF\uparrow$
4. $4NH_4HSO_4+O_2 \xrightarrow{fuel} 4SO_2+2N_2+10H_2O$
5. $SO_2+1/2O_2 \xrightarrow{catalyst} SO_3 \xrightarrow{H_2O} H_2SO_4$ (recycle to step 3)

STEP 1

Aqueous fluosilicic acid is conveniently obtained as a by-product from phosphate fertilizer or phosphoric acid manufacture. Crude fluosilicic acid solutions made as a by-product of these processes usually have concentrations varying from about 10 to about 25% by weight. In the process of the invention when crude fluosilicic acid is employed, it can be first passed to an evaporator wherein aqueous fluosilicic acid is separated from sulfuric acid, calcium oxide and phosphoric acid which are often present. Purified solutions of fluosilicic acid having concentrations up to about 40 percent by weight can also be employed in the present process. Alternatively, precursors of fluosilicic acid, such as silicon tetrafluoride, can be used instead of fluosilicic acid in the process of the invention.

Aqueous fluosilicic acid is treated with fresh anhydrous or aqueous ammonia and/or ammonia from step 2 described herein until a reaction mixture having a pH of about 9 to 9.5 is obtained. Ammonia is added in excess of the stoichiometric requirement to ensure conversion of practically all of the fluoride to ammonium fluoride. To facilitate reaction the fluosilicic acid solution is stirred during the ammonia addition which is preferably conducted at a temperature of about 50° to about 90°C., most preferably at about 75°C. Heat of reaction can be conveniently removed by cooling the reaction mixture in any suitable manner, such as cooling with a recirculating stream of fluosilicic acid. The reaction can be conducted either batchwise or in a continuous manner.

The reaction of ammonia and fluosilicic acid gives a slurry which contains soluble ammonium fluoride and insoluble silica. This slurry is digested for a sufficient period of time to bring the silica to an easily filterable form and, thereafter, is filtered to remove the silica. The filtrate contains practically all of the fluorine originally present in the fluosilicic acid as a solution of ammonium fluoride. Excess ammonia is also contained in the filtrate.

STEP 2

Ammonia and water are removed from the ammonium fluoride solution produced in the previous step. This removal can be accomplished by simple evaporation or by evaporation in at least two stages. For evaporation in two stages, ammonia and water are removed in the first stage by heating the solution preferably to a temperature of from about 140° to 150°C., most preferably 145°C., at atmospheric pressure. At 145°C. this treatment gives a solution containing about 30% $NH_4HF_2$, 40% $NH_4F$ and 30% $H_2O$ by weight. Solution from the first stage is passed to a second stage evaporating where more ammonia and water are evaporated preferably at a temperature of from about 175° to 185°C., most preferably 180°C., at atmospheric pressure while converting ammonium fluoride to liquid ammonium bifluoride. Liquid in the bottom of the evaporator in the second stage consists of $NH_4HF_2$ melt containing at 180°C. about 21% $NH_4F$ and 6% $H_2O$ by weight. Of course, at other pressures temperatures different from those given above can be employed to accomplish the same results.

Ammonia generated in the evaporation stages can be recycled to the first step. The ammonia can be separated from water vapor with which it is mixed by directing gas from the evaporator to a stripper where the gas is fractionated to recover gaseous ammonia for recycle. Generally, such separation will not be necessary for the gas emerging from the second stage of evaporation in a two stage evaporation step.

STEP 3

Molten ammonium bifluoride is treated with sufficient sulfuric acid to generate hydrogen fluoride and to convert the total ammonia content thereof to ammonium bisulfate. Preferably, a temperature of from about 170° to 190°C. is employed; most preferably about 180°C. Ammonium bisulfate is a liquid at these temperatures. Generally, a slight excess of sulfuric acid is added to the ammonium bifluoride to assure that all the ammonia has been reacted. The sulfuric acid is preferably 100% sulfuric acid by weight, since thereby water is kept to a minimum. Although less concentrated acid can be used, it may result in water being carried over with the hydrogen fluoride. Oleum can be used but the concentration of free $SO_3$ contained therein should be no more than that required to combine with $H_2O$ in the molten ammonium bifluoride.

Hydrogen fluoride generated in this step can be recovered by conventional means. One method of separating the hydrogen fluoride from the gaseous stream which also may contain minor amounts of sulfuric acid is to condense the stream and to separate anhydrous hydrogen fluoride by fractional distillation.

Ammonium bisulfate generated in this step often contains as much as about 2.7% hydrogen fluoride by weight. This ammonium bisulfate is introduced into the next step without further treatment or is, preferably, first treated with silica to reduce the hydrogen fluoride content to low values, such as 0.1–0.2% HF by weight. Silica from step (1) can be conveniently utilized for this treatment. The silica treatment converts residual HF to silicon tetrafluoride for recycle to step (1). The treatment is effected by mixing silica in an amount of about 10% by weight greater than that stoichiometrically required with the ammonium bisulfate melt and keeping the resulting mixture at a temperature of about 170° to 190°C. until substantially all the residual hydrogen fluoride has evolved as silicon tetrafluoride.

STEP 4

Ammonium bisulfate produced in the previous step is burned in oxygen or an oxygen containing gas to produce a gaseous mixture containing sulfur dioxide, carbon dioxide, nitrogen and water. This reaction is conducted at a temperature of about 850° to 1200°C., preferably 950° to 1050°C. as taught in U.S. Pat. 3,419,601. In a preferred embodiment, the ammonium bisulfate is sprayed into a furnace and burned to form sulfur dioxide. The furnace can be fired with carbon as in coal, or hydrocarbon gas, such as natural gas. The burning of the ammonium sulfate results in the oxidation of the ammonium ion to nitrogen, oxides of nitrogen and water. When operating under the preferred conditions of the present process, the nitrogen is present predominantly as $N_2$ which is not oxidized in the oxidation of sulfur dioxide to sulfur trioxide and is thus ultimately vented as $N_2$.

STEP 5

After the ammonium bisulfate has been burned to form a gaseous mixture containing sulfur dioxide, the gaseous mixture is cooled sufficiently to condense most of the water (usually to a temperature of less than 40°C.), scrubbed with condensate to remove the remaining water, undecomposed sulfuric acid and ash, heated to between 300° and 500°C. and then passed over a catalyst. Although platinum containing catalysts can be used for this step of the process of the invention, vanadium containing catalysts are preferred since they are less readily poisoned and are less reactive as catalyst for nitrogen thereby minimizing the amount of nitrogen that is oxidized. Oxygen is added to the gaseous mixture in an amount about 100 to 200% in excess of that stoichiometrically required on a molar basis to react with the sulfur dioxide to form sulfur trioxide.

The gas resulting from the catalytic oxidation is cooled and the sulfur trioxide is absorbed with water or, preferably, concentrated sulfuric acid usually at a temperature of less than 300°C. to form sulfuric acid or, fuming sulfuric acid. The sulfuric acid so produced is recycled to step (3) of the process of the invention. After the sulfur trioxide is absorbed from the gas, the remainder of the gas is vented.

The invention is further described by the following example in which all percentages are by weight unless otherwise specified.

EXAMPLE

This example illustrates steady state operation of a preferred embodiment of the invention. Referring to the drawing, crude aqueous fluosilicic acid solution is introduced into precipitator 4 through line 1 at a flow rate of 16,709 grams per second. The fluosilicic acid content of this solution expressed in terms of HF and $SiF_4$ is 5.05% and 14.7%, respectively. Recycle $SiF_4$ is added to the precipitator via line 36 at a flow rate of 371 grams per second. Ammonia is fed through line 3 at a flow rate of 3898 grams per second to precipitator 4 where a temperature of about 75°C. is maintained. The ammonia stream in line 3 is composed of fresh anhydrous ammonia from line 2 at a flow rate of 1540 grams per second and recycle ammonia from line 38 at a flow rate of 2358 grams per second. Reaction mixture in the precipitator is constantly stirred while neutralization is completed to pH of about 9.0. About 150 percent of stoichiometric ammonia is added to bring the reaction practically to completion.

After a hold-up time of 1 hour, the reaction mixture in the form of a slurry is passed through line 5 to filter 6 to remove silica. The filtered silica is washed with water from line 7 and removed via lines 9 and 10.

Filtrate containing about 23.6% $NH_4F$ is passed from filter 6 through line 8 at a flow rate of 24,199 grams per second to a first evaporator 11 operated at a temperature of about 145°C. Vapor from evaporator 11 is passed via line 12 to stripper 13 where ammonia is removed with steam fed through line 39. Temperature at the bottom of the stripper is maintained at 100°C. Ammonia separated by the stripper is passed through line 14 at a rate of 1938 grams per second and recycled to the precipitator via lines 38 and 3; water, practically free of ammonia, is discarded through line 40.

Crude ammonium bifluoride from evaporator 11 is passed via line 15 to a second evaporator 16 where ammonium bifluoride liquid is generated at about 180°C. and passed to hydrogen fluoride generator 18 through line 17 at a flow rate of 4811 grams per second. The liquid ammonium bifluoride stream contains approximately 73% ammonium bifluoride, 21% ammonium fluoride and 6% water. Vapors leave the second evaporator through line 37 at an ammonia flow rate of 420 grams per second and are recycled to the precipitator via lines 38 and 3.

In hydrogen fluoride generator 18 ammonium bifluoride is contacted with 100% sulfuric acid at 180°C. to produce hydrogen fluoride gas and molten ammonium bisulfate. Recycle sulfuric acid is fed through lines 26 and 32 at a flow rate of 9117 grams per second into the HF generator. Line 31 provides an inlet for fresh sulfuric acid for initiation of the process. Crude hydrogen fluoride containing about 98% HF and 2% $H_2SO_4$ is removed via line 19 at a flow rate of 3081 grams per second and is passed through condenser 20 and distillation train 23 to give practically pure anhydrous hydrogen fluoride which is removed via line 22 at a flow rate of 2703 grams per second. High biolers from the distillation train are returned to the hydrogen fluoride generator through line 33.

Ammonium bisulfate from hydrogen fluoride generator 18 is passed through line 25 at a flow rate of 11,235 grams per second to a defluorination unit 34 where $SiO_2$ filter cake is introduced through line 9. Silicon tetrafluoride evolved from the defluorination unit is recycled to precipitator 4 via line 36 at a rate of 371 grams per second.

Defluorinated ammonium bisulfate is passed through line 35 to sulfuric acid regeneration unit 24 wherein natural gas fuel from line 27 and air from line 28 are introduced. The ammonium bisulfate is burned at 1050°C. to produce a $SO_2$ containing gaseous mixture which is cooled to condense water, hydrogen fluoride, and any $SO_3$ and $P_2O_5$ which may be present. The resulting gaseous mixture is scrubbed with the condensate to remove traces of solids after which the condensate is withdrawn via line 30 and ash is removed by line 29. The gas stream containing $SO_2$ is passed at 440°C. through a vanadium pentoxide catalytic bed. The catalyst is preheated to 540°C. by circulation of heated air through the bed and air is passed over the bed. Sulfur trioxide produced by the catalytic oxidation of sulfur dioxide is absorbed at 200°C. with concentrated sulfuric acid by passing the gas through a series of absorption towers (not shown). Sulfuric acid produced in the sulfuric acid regeneration unit is passed through lines 26 and 32 back to HF generator 18 at a flow rate of 9127 grams per second.

The invention claimed is:

1. A process for producing anhydrous hydrogen fluoride from fluosilicic acid comprising the steps of (1) contacting an aqueous solution of fluosilicic acid with ammonia to produce an aqueous solution of ammonium fluoride and recovering said ammonium fluoride solution, said ammonia being present in excess of the amount required to react with all of said fluosilicic acid; (2) heating said ammonium fluoride solution to remove ammonia and water and to produce liquid ammonium bifluoride; (3) contacting said ammonium bifluoride with sulfuric acid to produce ammonium bisulfate and hydrogen fluoride and recovering ammonium bisulfate and anhydrous hydrogen fluoride; (4) burning the ammonium bisulfate at a temperature of from about 850° to 1200°C. to produce a gaseous mixture containing sulfur dioxide; 5) contacting the sulfur dioxide with oxygen in the presence of a catalyst to form sulfur trioxide; (6) contacting the sulfur trioxide with water to produce sulfuric acid; and (7) recycling said sulfuric acid to step (3).

2. The process of claim 1 where in step (4) ammonium bisulfate is contacted with oxygen at a temperature of from about 950° to 1050°C.

3. The process of claim 2 wherein ammonia from step (2) is recycled to step (1).

4. The process of claim 3 wherein the ammonium bisulfate from step (3) is treated with silica to remove fluorine values therefrom.

5. The process of claim 4 wherein anhydrous hydrogen fluoride is recovered in step (3) by fractional distillation.

6. The process of claim 1 where in step 2 first ammonia and water are removed by heating the aqueous solution of ammonium fluoride to a temperature of from about 140° to 150°C. and then the remaining solution is heated to a temperature of from about 175° to 185°C. to produce liquid ammonium bifluoride.

7. The process of claim 6 where in step (4) ammonium bisulfate is contacted with oxygen at a temperature of from about 950° to 1050°C.

8. The process of claim 7 wherein ammonia from step (2) is recycled to step (1).

9. The process of claim 8 wherein the ammonium bisulfate from step (3) is treated with silica to remove fluorine values therefrom.

10. The process of claim 9 wherein anhydrous hydrogen fluoride is recovered in step (3) by fractional distillation.

* * * * *